United States Patent
Grass

(10) Patent No.: US 7,359,388 B2
(45) Date of Patent: Apr. 15, 2008

(54) METHOD AND APPARATUS FOR FRAME PACKING IN LARGE NETWORKS

(75) Inventor: John Grass, Fremont, CA (US)

(73) Assignee: Network Equipment Technologies, Inc., Fremont, CA (US)

( * ) Notice: Subject to any disclaimer, the term of this patent is extended or adjusted under 35 U.S.C. 154(b) by 948 days.

(21) Appl. No.: 10/102,176

(22) Filed: Mar. 20, 2002

(65) Prior Publication Data

US 2003/0179744 A1 Sep. 25, 2003

(51) Int. Cl.
*H04L 12/28* (2006.01)

(52) U.S. Cl. ............... 370/401; 370/352; 370/474; 370/392

(58) Field of Classification Search ............ None
See application file for complete search history.

(56) References Cited

U.S. PATENT DOCUMENTS 6,975,629 B2 * 12/2005 Welin .................. 370/392
6,980,544 B2 * 12/2005 Hallenstal et al. ......... 370/352

* cited by examiner

*Primary Examiner*—Duc Ho
(74) *Attorney, Agent, or Firm*—Townsend and Townsend and Crew

(57) ABSTRACT

A method and apparatus are provided for frame packing for nodes in a network. In one example, the method includes receiving packet streams from network nodes; parsing the packet streams into individual calls; grouping the individual calls having the same destined node together into grouped calls; packing the grouped calls into single packets; and sending the single packets to the destined nodes.

24 Claims, 4 Drawing Sheets

METHOD AND APPARATUS FOR FRAME PACKING IN LARGE NETWORKS

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to nodes in a large network and, more particularly, to techniques for maximizing efficient use of bandwidth by network devices in a large Voice over Internet Protocol (VoIP) network.

2. Discussion of Background

In Voice over Internet Protocol (VoIP), a digitized voice stream is sent across an IP network with a certain amount of voice in each packet. Due to the small size of the voice stream (64 kb/s non-compressed, down to 4.8 kb/s compressed) and the required of low latency, the frame size of voice data to be sent in each packet is relatively small.

The Internet Protocol (IP) imposes a minimum of 20 bytes of headers, containing such information as the destination IP address. The User Datagram Protocol (UDP), typically used for voice transport applications, adds another six bytes of header information. A typical voice frame may be around 24 bytes (e.g. G.723.1 at 6.4 kb/s). The resulting total packet size is 50 bytes, of which 26 (52%) are overhead.

The result of the packet overhead is that to transport voice over IP, a little more than twice the bandwidth is required to transport the voice data with packet headers than the actual voice data itself. In addition, the packet sizes are exceeding small, which can tax the available processing power on routers in the IP network.

In order to minimize the packet overhead and increase the size of the voice packet (without increasing latency), frame packing techniques are used. With frame packing, multiple frames of voice data from different calls are put into the same packet. The packet overhead is then spread out over many calls. For example, if 50 calls are packed into the same packet, the resulting 900 bytes of data only require the same 26 overhead bytes (using G.723.1 at 6.4 kb/s as the example). The result is now only 2.9% of overhead, requiring only a small amount of additional bandwidth to transport the voice data. Further, the packet size is now much larger, significantly decreasing the number of packets the network routers must handle.

FIG. 1 shows a small VoIP network. In small VoIP networks, there may be up to a dozen VoIP nodes in the network. Frame packing works by packing all calls going to the same destination into the same packet stream (or multiple packet streams if required). With only a small number of other nodes to connect to a given node, there is high probability that there will be a large amount of calls going to all of the possible destination nodes. With a large amount of calls, frame packing is effective.

FIG. 2 shows a large VoIP network. In very large VoIP networks, there may be hundreds of VoIP nodes in the network. In this scenario, there is much less certainty there will be sufficient amount of calls going to each destination to allow frame packing to be effective.

BRIEF SUMMARY OF THE INVENTION

It has been recognized that what is needed is a technique for maximizing bandwidth efficiency in a large Voice over Internet Protocol (VoIP) network. Broadly speaking, the present invention fills this need by providing a method and apparatus for frame packing for nodes in a large network. It should be appreciated that the present invention can be implemented in numerous ways, including as a process, an apparatus, a system, a device or a method. Several inventive embodiments of the present invention are described below.

In one embodiment, a method is provided for a method of frame packing for nodes in a VoIP network. The method comprises receiving packet streams from network nodes; parsing the packet streams into individual calls; grouping the individual calls having the same destined node together into grouped calls; packing the grouped calls into single packets; and sending the single packets to the destined nodes.

In another embodiment, a frame packing hub is provided configured to perform frame packing for nodes in a network. The frame packing hub comprises a receiver device configured to receive packet streams; a parser device configured to parse the packet streams into individual calls; a grouper device configured to group the individual calls having the same destined node together into grouped calls; a packer device configured to pack the grouped calls into single packets; and a sender device configured to send the single packets to the destined nodes.

In still another embodiment, a frame packing hub having frame packing sub-hubs is provided, the frame packing hub being configured to perform frame packing for nodes in a network. Each frame packing sub-hub comprises a receiver device configured to receive packet streams; a parser device configured to parse the packet streams into individual calls; a grouper device configured to group the individual calls having the same destined node together into grouped calls; a packer device configured to pack the grouped calls into one or more single packets; and a sender device configured to send the one or more single packets to one or more destined nodes or to one or more appropriate sub-hubs. Accordingly, rather than send voice packets directly to the end destination, voice packets are sent to one, or perhaps a handful, of hub locations.

Advantageously, convergence to a hub or hubs will ensure that frame packing is very effective when leaving a node. Calls no longer have the possibility of hundreds of destination nodes, but only the small number of hub locations. Overhead is kept low and hence bandwidth efficiency is maximized. Moreover, packet size is maximized, diminishing processing demands on network routers.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

An invention is disclosed for a method and apparatus for frame packing for nodes in a network. Numerous specific details are set forth in order to provide a thorough understanding of the present invention. It will be understood, however, to one skilled in the art, that the present invention may be practiced without some or all of these specific details.

General Overview

Voice packets are sent to one, or perhaps a handful, of hub locations, instead of sending voice packets directly to the end destination.

Figure 1:
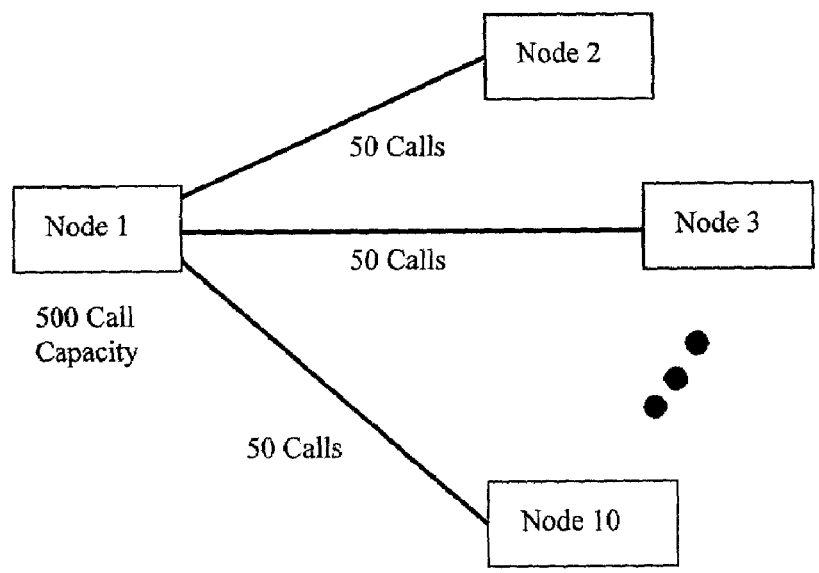
FIG. 1 shows a small Voice over Internet Protocol (VoIP) network.
Figure 2:
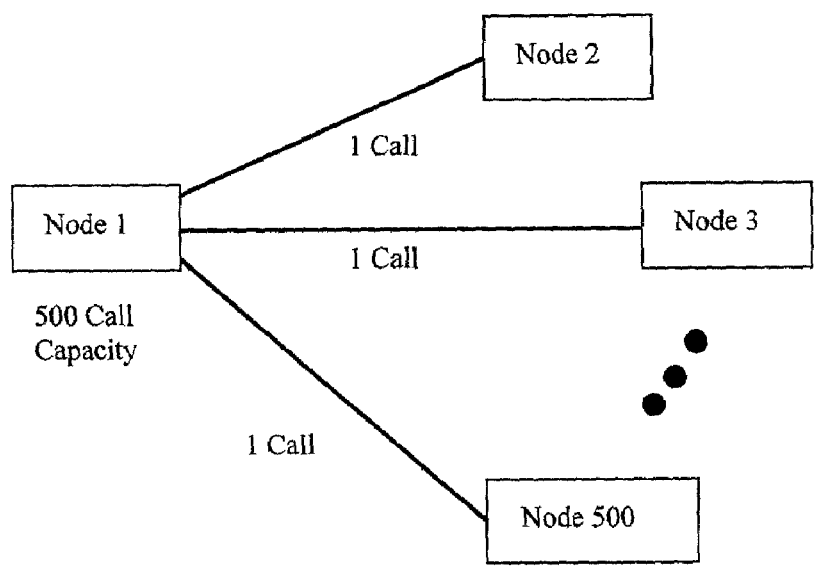
FIG. 2 shows a large VoIP network.
Figure 3:
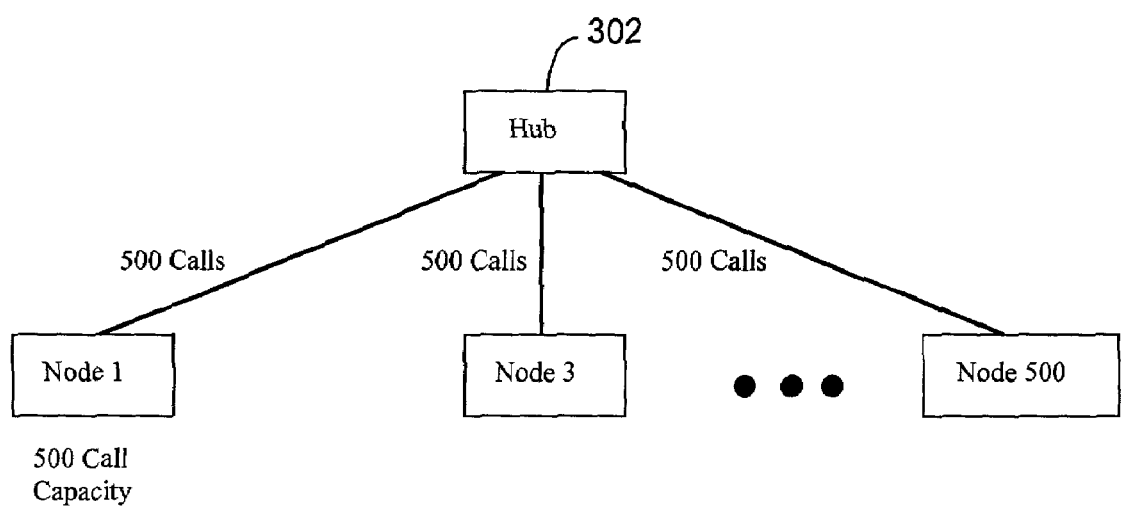
FIG. 3 is a block diagram illustrating a single frame packing hub in communication with many network nodes, in accordance with on embodiment of the present invention.

FIG. 3 is a block diagram illustrating a single frame packing hub 302 in communication with many network nodes, in accordance with on embodiment of the present invention. In the theoretical ideal, the VoIP frame packing hub 302 location receives all the voice streams from all of the network nodes. Each node only has one communication path, which is to the hub 302. This convergence ensures that each node in using frame packing to its maximum efficiency. At the hub 302, incoming packet streams from a node are parsed. Calls destined for a particular node (the destined node) are sent to that node with all the other calls from the network also destined for that same node.

This frame packing technique is preferably applied in a large Voice over Internet Protocol (VoIP) network. However, the embodiment is not so limited. This frame packing technique is applicable in networks using other types of protocols, such as Transfer Control Protocol/Internet Protocol (TCP/IP).

Bandwidth and Packet Processing Savings

Assume a 500 node network and each node can handle 500 calls. Also assume that the call distribution is such that each node evenly distributed its calls to 100 other nodes (5 calls to each). The packet sizes are 5*24 bytes of voice data plus 26 bytes of overhead for a total size of 146 bytes. This gives a bandwidth penalty of 22% from the original bandwidth requirement. Total bandwidth requirement is 3.9 Mb/s. In addition, a total of 100 of these 146 byte-sized packets are required to be transmitted for all the calls on the node every 30 ms (codec frame size) or 3333 packets/second.

Using a central hub to which each node sends all its voice packets, each node in the above example would send 10 streams of voice packets to the central hub. Assume 50 calls per packet, ten packet streams of packets with length 50*24 bytes plus 26 bytes of overhead for a total size of 1226. Bandwidth penalty is only 2.2% and so overall bandwidth requirement is 3.3 Mb/s (a saving of 0.6 Mb/s). Total number of packets for all calls is reduced to only 333 packets/second, a drastic reduction from 3333 packets/second.

Multiple Hubs in Network

In practice, having one hub in a very large network is not feasible because it is unlikely to be able to have the processing power required to handle all the packets in the network. One solution is to have multiple hubs in the network. In the above example of a 500 node network, having 10 hubs would reduce the processing power required at each hub location by a tenth. There would be little impact to the efficiency of the packet streams since the nodes would have most likely required multiple streams to the one central hub anyway (ten in this example). There should not be too many hubs in the network though, or the frame packing efficiency cannot be achieved. To generally quantify the maximum number of hubs, number of hubs <[node capacity/(ideal number of calls per frame)].

Multiple hubs in the network would also provide for needed redundancy. It would not be very robust to have the entire network relying on one central hub.

Multiple Hub Devices at a Hub Location

Even with multiple hubs in the network, it may still not be possible to create a hub node powerful enough to handle all the required packets. In the above example, with 10 hub locations, each hub node must still be 50 times more powerful than each of the nodes on the network. Such processing power may still be unreasonable to achieve.

A solution to reduce the requirements of the central hub is to have multiple sub-hub devices at a hub location to handle all the incoming traffic. Each device can be dedicated to a fixed number of nodes.

Figure 4:
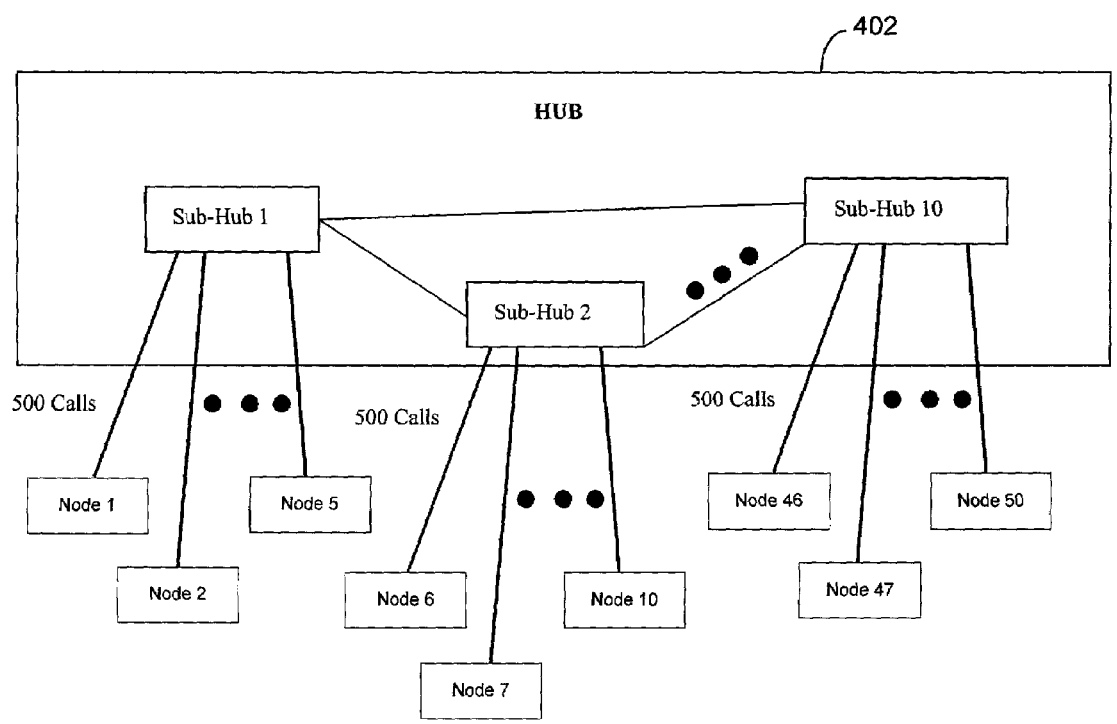
FIG. 4 is a block diagram illustrating multiple sub-hub devices at one hub location, in accordance with one embodiment of the present invention.

FIG. 4 is a block diagram illustrating multiple sub-hub devices at one hub location 402, in accordance with one embodiment of the present invention. Assume in the above example that with 10 hub locations in the network, each hub location must handle 50 nodes, equaling a total of 500 nodes. At each hub location 402 there could be a number of sub-hub devices. If for example there were 10 sub-hub devices, each device would handle 5 nodes. The traffic from the 5 nodes into a sub-hub device would be routed to the appropriate sub-hub device also located at the same hub location 402, or directly to the destined node. Traffic between the sub-hub devices is all local as the devices are all co-located and do not use network bandwidth. Hence, in this example, each sub-hub device need only be 5 times more powerful than each of the network nodes.

Overview of Process

Figure 5:
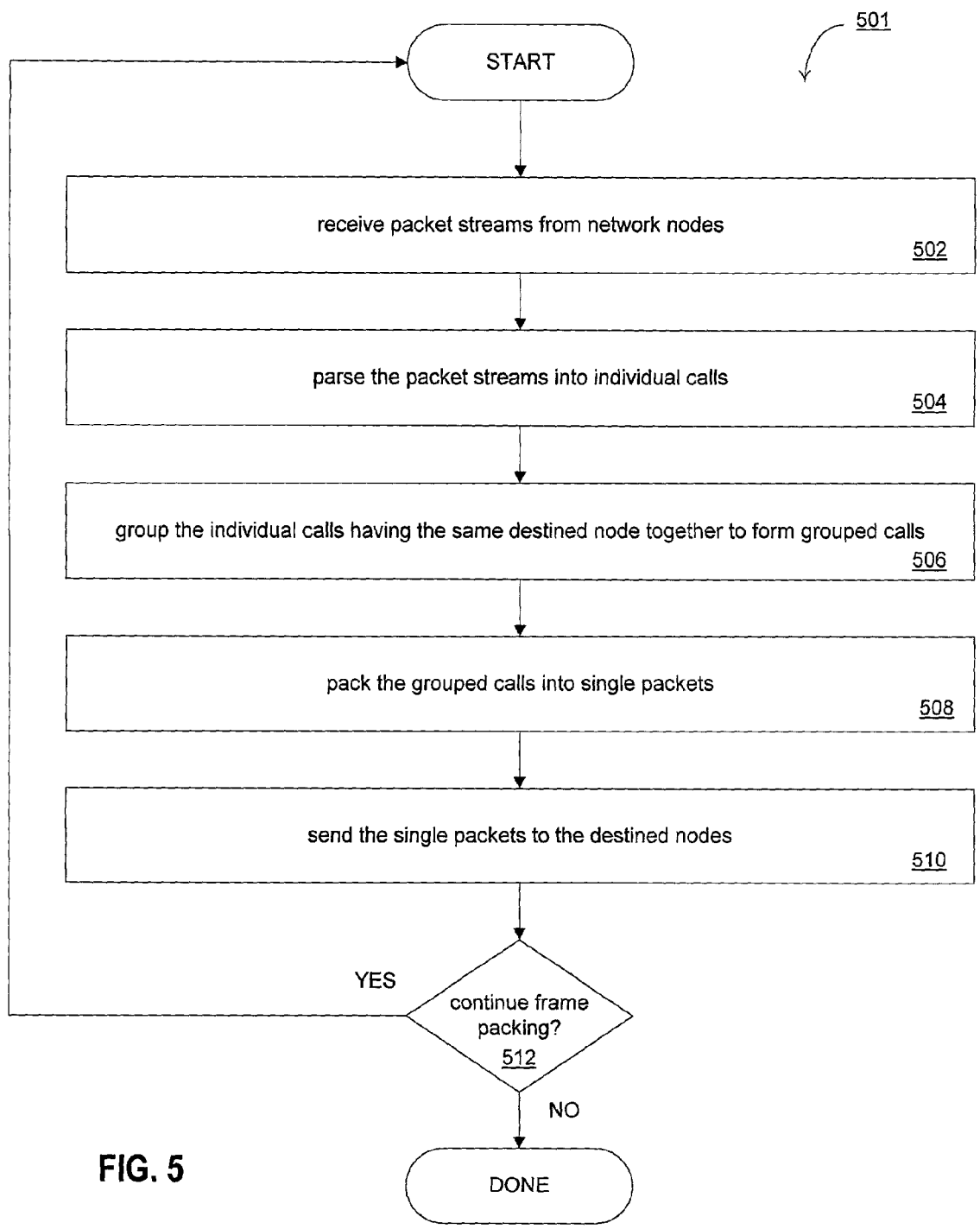
FIG. 5 is a flowchart for a frame packing process for nodes in a network, in accordance with one embodiment of the present invention.

FIG. 5 is a flowchart for a frame packing process 501 for nodes in a network, in accordance with one embodiment of the present invention. The process starts in step 502 where the hub receives packet streams from various network nodes. As stated above with reference to FIG. 3, packet streams may be received from a multitude of nodes. For explanation purposes, however, the following discussion will involve a hub receiving messages from a minimum of two network nodes. The hub may receive from a first network node a first packet stream having a first set of individual calls destined for a particular node. The same hub may also receive from a second network node a second packet stream having a second set of individual calls also destined for the same particular node.

The process moves to step 504 where the hub parses the packet streams into individual calls. Each individual calls has destined nodes for which the individual calls are intended. Many packet streams are parsed because the hub receives many packet streams from many different nodes. The hub may parse the first packet stream to obtain the first set of individual calls. The hub may also parse the second packet stream to obtain the second set of individual calls.

In step 506, the hub groups individual calls having the same destined node together into grouped calls.

The process goes to step 506 where the hub packs the grouped calls into single packets. In this embodiment, note that the first and second set of individual calls are in a group, and this group is packed into a particular single packet.

The process then moves to step 508 where the hub sends the single packet to the destined nodes. In this embodiment, the particular single packet is sent to the particular node, which is the node where all of the packets in that particular single packet were originally destined. Alternatively, as discussed above with reference to FIG. 4, the particular single packet may also be sent to the appropriate sub-hub where additional grouping and packing occur. The sub-hub in turn sends the particular single packet to the destined node.

Next, in decision operation 510 it is determined if the frame packing is to continue. If the frame packing is to continue, the process 501 returns to step 502 where the hub receives more packet streams from more network nodes. However, if the frame packing is not to continue, then the process 501 is done.

System And Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, receiving packet streams from network nodes, parsing the packet streams into individual calls, grouping the individual calls having the same destined node together into grouped calls, packing the grouped calls into single packets, and sending the single packets to the destined nodes, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of frame packing in a network, the method comprising:

receiving first packet streams at a hub device, each of the first packet streams corresponding to a different network node in a plurality of network nodes distinct from the hub device, and each of the first packet streams containing call data for at least two destinations among the plurality of network nodes;

parsing the first packet streams at the hub device to obtain individual calls from the call data such that individual calls from different nodes among the plurality of network nodes are available for processing at the hub device;

grouping individual calls having the same destination node into grouped calls;

packing the grouped calls into single packets, each of the single packets including call data for only one destination node; and sending the single packets from the hub device to the destination node corresponding to their respective grouped calls, wherein receiving the first packet streams at the hub device increases the likelihood that call data for a larger number of calls can be packed into the resulting single packets.

2. The method of claim 1, wherein the step of receiving packets further comprises:

receiving from a first network node a first packet stream including a first set of individual calls destined for a particular node; and receiving from a second network node a first packet stream including a second set of individual calls also destined for the particular node.

3. The method of claim 2, wherein the step of parsing the packets further comprises:

parsing the first packet stream from the first network node to obtain the first set of individual calls; and parsing the first packet stream from the second network node to obtain the second set of individual calls.

4. The method of claim 2, wherein the step of packing the grouped calls comprises packing the first and second set of individual calls into a particular single packet.

5. The method of claim 4, wherein the step of sending the single packets comprises sending the particular single packet to the particular node.

6. The method of claim 1, wherein the frame packing is Voice over Internet Protocol (VoIP) frame packing, and wherein the packets are VoIP packets.

7. The method of claim 1, wherein the step of receiving first packet streams comprising receiving first packet streams from at least 10 nodes.

8. The method of claim 1, wherein the grouped calls include call data received from at least two different nodes.

9. A frame packing hub configured to perform frame packing for nodes in a network, the frame packing huh comprising:
  a receiver device configured to receive first packet streams, each of the first packet streams corresponding to a network node in a plurality of network nodes distinct from the frame packing hub, and each of the first packet streams containing call data for at least two destinations among the plurality of network nodes;
  a parser device configured to parse the first packet streams to obtain individual calls from call data such that individual calls from different nodes among the plurality of network nodes are available for processing at the frame packing hub;
  a grouper device configured to group individual calls having the same destination node together into grouped calls;
  a packer device configured to pack the grouped calls into single packets, each of the single packets including call data for only one destination node; and
  a sender device configured to send the single packets from the frame packing hub to their respective destination nodes,
  wherein the frame packing hub is configured to receive first packet streams from a plurality of network nodes increasing the likelihood that call data for a larger number of calls can be packed into the resulting single packets.

10. The frame packing hub of claim 9, wherein the receiver device is further configured to:
  receive from a first node a first packet stream including a first set of individual calls destined for a particular node; and
  receive from a second network node a first packet stream including a second set of individual calls also destined for the particular node.

11. The frame packing hub of claim 10, wherein the parser device is further configured to:
  parse the first packet stream from the first node to obtain the first set of individual calls; and
  parse the first packet stream from the first node to obtain the second set of individual calls.

12. The frame packing hub of claim 10, wherein the packer device is further configured to pack the first and second set of individual calls into a particular single packet.

13. The frame packing hub of claim 12, wherein the sender device is further configured to send the particular single packet to the particular node.

14. The frame packing hub of claim 9, wherein the frame packing is Voice over Internet Protocol (VoIP) frame packing, and wherein the packets are VoIP packets.

15. The frame packing hub of claim 9, wherein the grouped calls include call data received from at least two different nodes.

16. A frame packing hub having a plurality of frame packing sub-hubs configured to perform frame packing for nodes in a network, each frame packing sub-hub comprising:
  a receiver device configured to receive first packet streams, each of the first packet streams corresponding to a network node in a plurality of network nodes distinct from the frame packing hub, and each of the first packet streams containing call data for at least two destinations among the plurality of network nodes;
  a parser device configured to parse the first packet streams to obtain individual calls from the call data such that individual calls from different nodes among the plurality of network nodes are available for processing at the hub device;
  a grouper device configured to group individual calls having the same destination node together into grouped calls;
  a packer device configured to pack the grouped calls into single packets, each of the single packets including call data for only one destination node; and
  a sender device configured to send the single packets from the sub-hub to their respective destination nodes,
  wherein receiving first packet streams from the predetermined number of network nodes increases the likelihood that call data for a larger number of calls can be packed into the resulting single packets.

17. A computer-readable medium carrying one or more sequences of one or more instructions for frame packing for nodes in a network, the one or more sequences of one or more instructions including instructions which, when executed by one or more processors, cause the one or more processors to perform the steps of:
  receiving first packet streams at a hub device, each of the first packet streams corresponding to a network node in a plurality of network nodes distinct from the hub device, and each of the first packet streams containing call data for at least two destinations among the plurality of network nodes;
  parsing the first packet streams at the hud device to obtain individual calls from the call data such that individual calls from different nodes among the plurality of network nodes are available for processing at the hub device;
  grouping individual calls having the same destination node into grouped calls;
  packing the grouped calls into single packets, each of the single packets including call data for only one destination node; and
  sending the single packets from the hub device to the destination node corresponding to their respective grouped calls,
  wherein receiving the first packet streams at the hub device increases the likelihood that call data for a larger number of calls can be packed into the resulting single packets.

18. The computer readable medium of claim 17, wherein the step of receiving first packet streams further causes the processors to perform the steps of:
  receiving from a first network node a first packet stream having a first set of individual calls destined for a particular node; and receiving from a second network node a first packet stream having a second set of individual calls also destined for the particular node.

19. The computer-readable medium of claim 18, wherein the step of parsing the packet streams further causes the processors to perform the steps of:
   parsing the first packet stream from the first node to obtain the first set of individual calls; and
   parsing the first packet stream from the second node to obtain the second set of individual calls.

20. The computer-readable medium of claim 18, wherein the step of packing the grouped calls further causes the processors to perform the step of packing the first and second set of individual calls into a particular single packet.

21. The computer-readable medium of claim 20, wherein the step of sending the single packets further causes the processors to perform the step of sending the particular single packet to the particular node.

22. The computer-readable medium of claim 17, wherein the frame packing is Voice over Internet Protocol (VoIP) frame packing, and wherein the packet streams are VoIP packet streams.

23. The computer-readable medium of claim 17, wherein the step of receiving packet streams further causes the processors to perform the step of receiving packet streams from at least 10 nodes.

24. A hub configured to perform frame packing of call data originating from a plurality of network nodes distinct from the frame packing hub, comprising:
   a receiver configured to receive data streams containing the call data, each data stream representing a plurality of calls originating from a single node in the plurality of network nodes, and wherein said plurality of calls includes calls destined for at least two different network nodes;
   a processor configured to extract call data representative of individual calls from the data streams and to identify a destination node for each individual call,
   the processor further configured to add call data representative of individual calls having the same destination node into one or more single packets such that the number of single packets required to carry call data originating from the plurality of nodes is minimized; and
   a transmitter configured to transmit the single packets to the respective destination nodes over the network.

* * * * *